(12) United States Patent
Matsubara (10) Patent No.: US 9,971,167 B2
(45) Date of Patent: May 15, 2018

(54) ELECTRONIC APPLIANCE, AND METHOD FOR COMBINING TOGETHER LASER LIGHT

(71) Applicant: FUNAI ELECTRIC CO., LTD., Osaka (JP)

(72) Inventor: Hiroki Matsubara, Lexington, KY (US)

(73) Assignee: Funai Electric Co., Ltd., Osaka (JP)

(*) Notice: Subject to any disclaimer, the term of this patent is extended or adjusted under 35 U.S.C. 154(b) by 387 days.

(21) Appl. No.: 14/799,806

(22) Filed: Jul. 15, 2015

(65) Prior Publication Data
US 2016/0018665 A1   Jan. 21, 2016

(30) Foreign Application Priority Data

Jul. 17, 2014 (JP) ................. 2014-147036

(51) Int. Cl.
*G02B 27/48* (2006.01)
*G02B 27/10* (2006.01)
*G02B 27/28* (2006.01)

(52) U.S. Cl.
CPC ......... *G02B 27/48* (2013.01); *G02B 27/1006* (2013.01); *G02B 27/1086* (2013.01); *G02B 27/283* (2013.01)

(58) Field of Classification Search
CPC .............. G03B 21/006; G03B 21/2013; G03B 21/2033; G03B 21/2073; H04N 9/3155; H04N 9/3161; H04N 9/3167; G02B 5/32; G02B 5/1861; G02B 27/1866
See application file for complete search history.

(56) References Cited

U.S. PATENT DOCUMENTS 4,511,220 A   4/1985   Scully
6,072,581 A   6/2000   Stephenson et al.
(Continued)

FOREIGN PATENT DOCUMENTS

JP   2000-136909 A   5/2000
JP   2012-073476 A   4/2012

OTHER PUBLICATIONS

Extended European Search Report issued in corresponding European Patent Application No. 15177015.3 dated Dec. 9, 2015.
(Continued)

*Primary Examiner* — Sultan Chowdhury
(74) *Attorney, Agent, or Firm* — Morgan, Lewis & Bockius LLP (57) ABSTRACT

An electronic appliance has a first polarization convertible diffraction device which splits laser light emitted from a light source into a plurality of components of the laser light; a second polarization convertible diffraction device which combines together the plurality of components of the laser light into combined laser light; an optical path length adjuster which adjusts the optical path length difference between the plurality of components of the laser light along the path between the first and second polarization convertible diffraction devices; and an angle-of-incidence adjuster which adjusts, to predetermined angles, the angles of incidence at which the plurality of components of the laser light are respectively incident on the second polarization convertible diffraction device.

20 Claims, 6 Drawing Sheets

(56) References Cited

U.S. PATENT DOCUMENTS

| | | | |
|---|---|---|---|
| 6,195,136 B1* | 2/2001 | Handschy | G02B 27/1033 349/5 |
| 2004/0109143 A1* | 6/2004 | Imahase | H04N 9/3105 353/31 |
| 2004/0109219 A1 | 6/2004 | Kikuchi | |
| 2004/0169929 A1* | 9/2004 | Sato | G02B 5/1819 359/558 |
| 2006/0055993 A1* | 3/2006 | Kobayashi | G03H 1/02 359/3 |
| 2007/0182931 A1* | 8/2007 | Ushiro | G02B 27/286 353/20 |
| 2009/0190618 A1 | 7/2009 | Kuksenkov et al. | |
| 2011/0310356 A1* | 12/2011 | Vallius | G02B 27/102 353/31 |
| 2013/0300997 A1 | 11/2013 | Popovich et al. | |

OTHER PUBLICATIONS

Office Action dated Mar. 27, 2018 in corresponding Japanese Application No. 2014-147036.

* cited by examiner

ELECTRONIC APPLIANCE, AND METHOD FOR COMBINING TOGETHER LASER LIGHT

The present application is based on, and claims priority from, Japanese Patent Application No. 2014-147036, filed on Jul. 17, 2014, the disclosure of which is hereby incorporated by reference herein in its entirety.

BACKGROUND OF THE INVENTION

1. Field of the Invention

The present invention relates to an electronic appliance, and a method for combining together laser light, that can reduce speckles.

2. Description of Related Art

It is known that, when a coarse surface, such as the surface of paper or a wall, is illuminated with coherent light, such as laser light, and the light transmitted or reflected is inspected, bright and dim spots are observed. These bright and dim spots are generally called speckles. Speckles degrade the image projected from laser projectors, and various methods for reducing speckles have conventionally been proposed.

For example, according to Japanese Patent Application Publication No. 2012-73476, polarized light emitted from a laser light source enter a polarizing beam splitter (PBS) so that a p-polarized light component is transmitted while an s-polarized light component is reflected. The two components then travel different optical paths before they are eventually combined together. In this way, two patterns of speckles that have traveled different optical paths (optical path lengths) are overlaid together, and thereby the contrast of speckles is reduced.

In a configuration like the one described just above where a PBS is used to split and combine light, a deviation in the angle at which light is incident greatly affects the angle at which the light is reflected. This makes it difficult to combine light accurately, leading to a diminished effect of reducing speckles.

Against the background discussed above, an object of the present invention is to provide an electronic appliance, and a method for combining together laser light, that can combine split light accurately to reduce speckles.

SUMMARY OF THE INVENTION

To achieve the above object, according to one aspect of the present invention, an electronic appliance includes: a first polarization convertible diffraction device which splits laser light emitted from a light source into a plurality of components of the laser light; a second polarization convertible diffraction device which combines together the plurality of components of the laser light into combined laser light; an optical path length adjuster which adjusts the optical path length difference between the plurality of components of the laser light along the path between the first and second polarization convertible diffraction devices; and an angle-of-incidence adjuster which adjusts, to predetermined angles, the angles of incidence at which the plurality of components of the laser light are respectively incident on the second polarization convertible diffraction device.

In the electronic appliance configured as described above, it is preferable that the optical path length adjuster include a prism.

In the electronic appliance configured as described above, it is preferable that the angle-of-incidence adjuster include a third polarization convertible diffraction device.

In the electronic appliance configured as described above, it is preferable that the prism comprise a reflective member arranged between the first and second polarization convertible diffraction devices, and that the reflective member reflect at least one of the plurality of components of the laser light.

In the electronic appliance configured as described above, it is preferable that the plurality of components of the laser light be reflected different numbers of times respectively on the reflective member.

In the electronic appliance configured as described above, it is preferable that the prism comprise a plurality of refractive members.

In the electronic appliance configured as described above, it is preferable that the plurality of refractive members be arranged between the first and second polarization convertible diffraction devices, in the optical path of, out of the plurality of components of the laser light, a first component of the laser light but not in the optical path of, out of the plurality of components of the laser light, a second component of the laser light.

In the electronic appliance configured as described above, it is preferable that the plurality of refractive members all have an identical structure.

In the electronic appliance configured as described above, it is preferable that the first and second polarization convertible diffraction devices be arranged at a predetermined distance away from each other.

In the electronic appliance configured as described above, it is preferable that the optical path length adjuster serve also as the angle-of-incidence adjuster.

In the electronic appliance configured as described above, it is preferable that the light in which a plurality of mutually different polarization states are combined together as an incoherent combination.

In the electronic appliance configured as described above, it is preferable that the direction in which the laser light emitted from the light source is incident on the first polarization convertible diffraction device is substantially identical with the direction in which the combined laser light emerges from the second polarization convertible diffraction device as a result of the plurality of components of the laser light being combined together.

In the electronic appliance configured as described above, it is preferable that there by further provided a plurality of light emitting devices which emit light of mutually different colors respectively, and that the light source comprise at least one of the plurality of light emitting devices.

In the electronic appliance configured as described above, it is preferable that the optical path length difference be equal to or larger than the coherent length of the laser light emitted from the light source.

According to another aspect of the present invention, an electronic appliance includes: a first polarization convertible diffraction device which splits laser light emitted from a light source into a plurality of components of the laser light and which combines together the plurality of components of the laser light into combined laser light; an optical path length adjuster which adjusts the optical path length difference between the plurality of components of the laser light along the path from splitting to combining by the first polarization convertible diffraction device; and an angle-of-incidence adjuster which adjusts, to predetermined angles, the angles of incidence at which the plurality of components of the laser light are respectively incident on the first polarization convertible diffraction device.

In the electronic appliance configured as described above, it is preferable that the optical path length adjuster include a prism.

In the electronic appliance configured as described above, it is preferable that the angle-of-incidence adjuster include a second polarization convertible diffraction device.

In the electronic appliance configured as described above, it is preferable that the laser light emitted from the light source pass through the first and second polarization convertible diffraction devices a plurality of times.

In the electronic appliance configured as described above, it is preferable that the direction in which the laser light emitted from the light source is incident on the first polarization convertible diffraction device is substantially opposite to the direction in which the combined laser light emerges from the first polarization convertible diffraction device as a result of the plurality of components of the laser light being combined together.

According to yet another aspect of the present invention, a method for combining together laser light includes: splitting, by a first polarization convertible diffraction device, laser light emitted from a light source into a plurality of components of the laser light; combining together, by a second polarization convertible diffraction device, the plurality of components of the laser light; adjusting the optical path length difference between the plurality of components of the laser light along the path between the first and second polarization convertible diffraction devices; and adjusting, to predetermined angles, the angles of incidence at which the plurality of components of the laser light are respectively incident on the second polarization convertible diffraction device.

DETAILED DESCRIPTION OF PREFERRED EMBODIMENTS

First Embodiment

Figure 01:
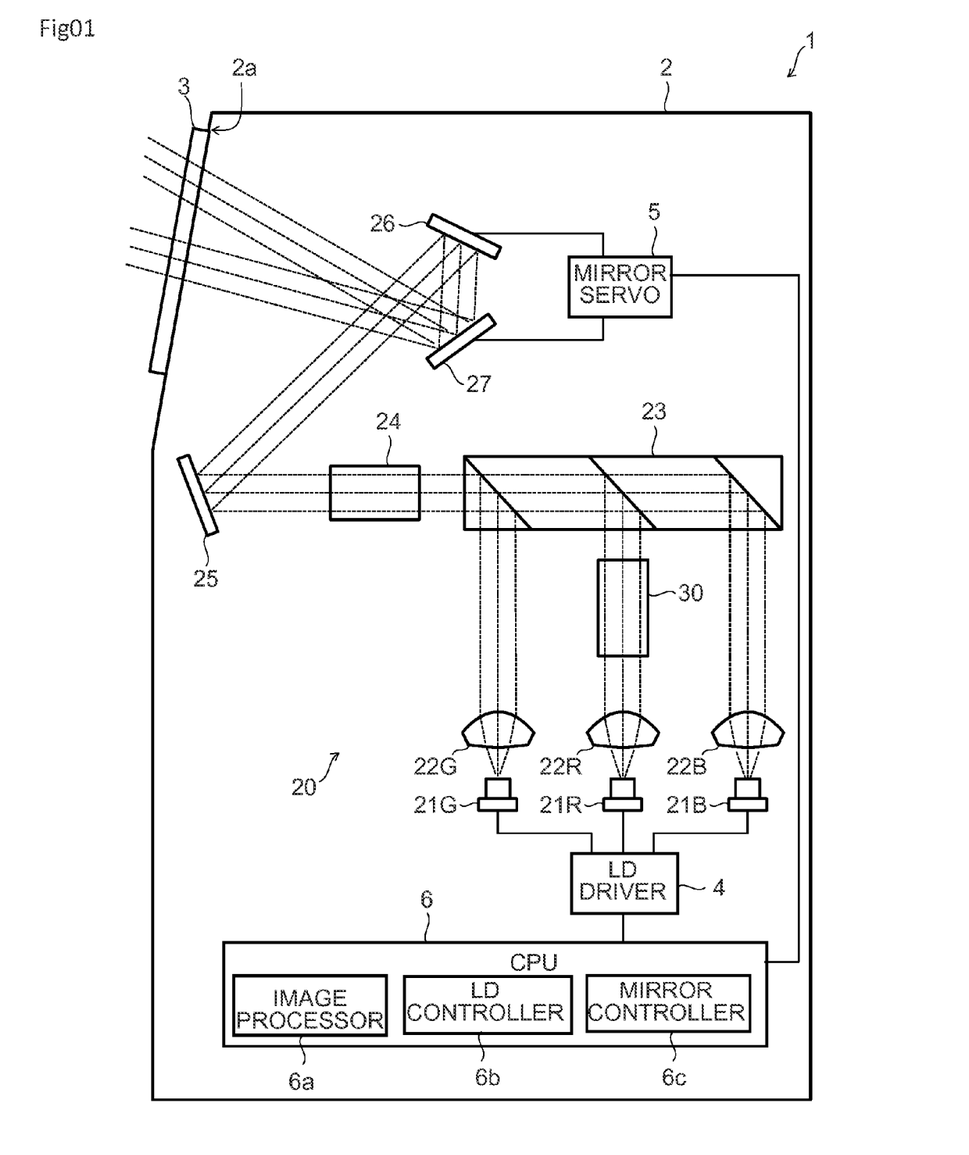
FIG. 1 is an outline configuration diagram of a laser scanning projector according to a first embodiment of the present invention.

Hereinafter, as one example of an electronic appliance embodying the present invention, an optical appliance, and in particular a laser scanning projector, will be described. FIG. 1 is an outline configuration diagram of a laser scanning projector according to a first embodiment of the present invention.

As shown in FIG. 1, the laser scanning projector 1 has a housing 2 for housing different components thereof. The housing 2 has a sealed window 3, which is a light guiding member through which scanning laser light is led out of the housing 2. Preferably, the sealed window 3 is formed of, for example, glass, or a transparent resin material. The sealed window 3 serves to prevent entry of dust, moisture, etc., into the housing 2 from outside. The sealed window 3 is fitted in an opening 2a formed in the housing 2.

Inside the housing 2, there are housed an optical system 20 including three laser diodes (hereinafter referred to as LDs) 21R, 21G, and 21B; an LD driver 4, a mirror servo 5, and a CPU 6. The laser scanning projector 1 may further include other components such as a power supply, an operation panel, a memory, and an input/output interface as necessary. In this embodiment, the LD 21R constitutes a light source that feeds laser light to an optical path length adjuster 30, which will be described later.

The LD 21R is a light emitting device that emits red laser light. The LD 21G is a light emitting device that emits green laser light. The LD 21B is a light emitting device that emits blue laser light. The LDs 21R, 21G, and 21B will occasionally be referred to collectively as "LDs 21".

The optical system 20 further includes collimator lenses 22R, 22G, and 22B, an RGB combiner prism 23, a converging lens 24, a deflecting mirror 25, a horizontal scanning mirror 26, a vertical scanning mirror 27, and an optical path length adjuster 30 (which will be described in detail later). The optical system 20 may further include other optical devices as necessary.

The collimator lenses 22R, 22G, and 22B are optical devices that convert the light beams (laser light) emitted from the LDs 21R, 21G, and 21B each into a parallel beam. The laser light of the different colors that have passed through the collimator lenses 22R, 22G, and 22B are combined together by the RGB combiner prism 23. The laser light combined together by the RGB combiner prism 23 is converged by the converging lens 24, and is then reflected by the deflecting mirror 25 to have its travel direction deflected.

The laser light reflected from the deflecting mirror 25 reaches the horizontal scanning mirror 26 and then the vertical scanning mirror 27. The horizontal scanning mirror 26 displaces the laser light in the horizontal direction, and the vertical scanning mirror 27 displaces the laser light in the vertical direction.

The LD driver 4 controls the driving of each of the LDs 21R, 21G, and 21B. The LD driver 4 can control the driving of each of the LDs 21R, 21G, and 21B in terms of their turning on and off and their output.

The mirror servo 5 is a driving controller that controls the displacement of the horizontal scanning mirror 26 and the vertical scanning mirror 27. For example, the mirror servo 5 drives the horizontal scanning mirror 26 according to a horizontal synchronizing signal from the CPU 6 so as to displace in the horizontal direction the direction in which the laser light is reflected. Likewise, the mirror servo 5 drives the vertical scanning mirror 27 according to a vertical synchronizing signal from the CPU 6 so as to displace in the vertical direction the direction in which the laser light is reflected.

The CPU 6 is a controller that controls the individual components of the laser scanning projector 1 by use of programs, control information, etc. stored in an unillustrated memory or the like. The CPU 6 includes an image processor 6a, an LD controller 6b, and a mirror controller 6c.

The image processor 6a generates image information based on programs stored in an unillustrated memory or the like and information input via an unillustrated input/output interface. The image processor 6a also converts the generated image information into image data of three colors, namely red, green, and blue. The converted three-color image information is output to the LD controller 6b. Based on the three-color image information, the LD controller 6b generates light control signals for the LDs 21R, 21G, and 21B respectively and outputs them to the LD driver 4. Based on the image information, the mirror controller 6c generates control signals for controlling the directions of the horizontal and vertical scanning mirrors 26 and 27 and outputs them to the mirror servo 5.

Figure 02:
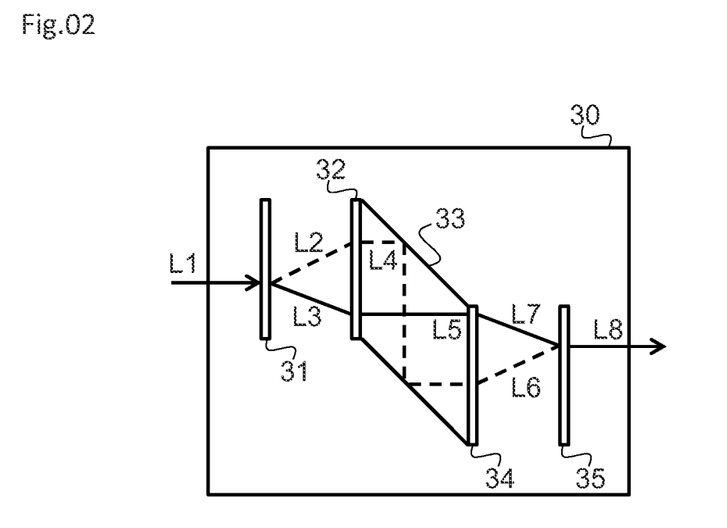
FIG. 2 is an outline configuration diagram of an optical path length adjuster provided in a laser scanning projector according to the first embodiment.

The optical path length adjuster 30 is a device that splits the light incident into it into two components, produces an optical path length difference between the two split components of the light, and then combines them together. Referring to FIG. 2, the optical path length adjuster 30 includes, in the order along the travel direction of the incident light L1, a first OC-type polarizing diffraction grating (polarization convertible diffraction device) 31, a second OC-type polarizing diffraction grating 32, a third OC-type polarizing diffraction grating 34, and a fourth OC-type polarizing diffraction grating 35. These OC-type polarizing diffraction gratings are arranged at predetermined intervals from each other. Moreover, a reflective member 33 is arranged between the second and third OC-type polarizing diffraction gratings 32 and 34.

The following description of the embodiment assumes that the optical path length adjuster 30 is configured to include a first to a fourth OC-type polarizing diffraction grating 31, 32, 34, and 35 and a reflective member 33, but the optical path length adjuster 30 may instead be configured to include part of those components. For example, the optical path length adjuster 30 may include a second and a third OC-type polarizing diffraction grating 32 and 34 and a reflective member 33, but not a first and a fourth OC-type polarizing diffraction grating 31 and 35. The optical path length adjuster 30 serves not only to produce an optical path length difference between the split components of the light but also to make them incident into the fourth OC-type polarizing diffraction grating 35 at a predetermined angle. Thus, the optical path length adjuster 30 may be considered to be so configured as to include an incident angle adjuster that adjusts the angle of incidence of the split components of the light with respect to the fourth OC-type polarizing diffraction grating 35. Alternatively, the optical path length adjuster 30 and the incident angle adjuster may be considered to be equivalent to each other. In this embodiment, the reflective member 33 can be said to be configured to be used chiefly to adjust the optical path length difference, and the third OC-type polarizing diffraction grating 34 can be said to be configured to be used chiefly to adjust the angle of incidence of the split components of the light with respect to the fourth OC-type polarizing diffraction grating 35.

Figure 03:
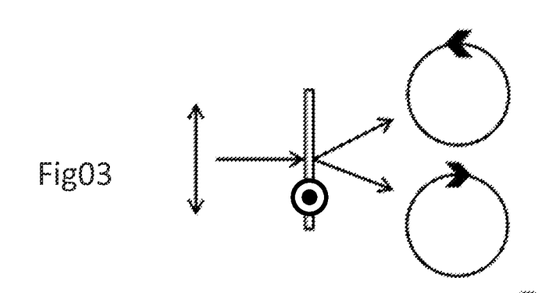
FIG. 3 is a first diagram showing a basic property of an OC-type polarizing diffraction grating.
Figure 04:
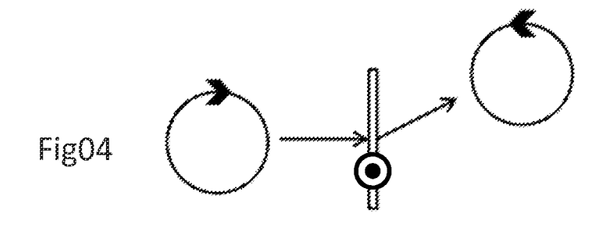
FIG. 4 is a second diagram showing a basic property of an OC-type polarizing diffraction grating.
Figure 05:
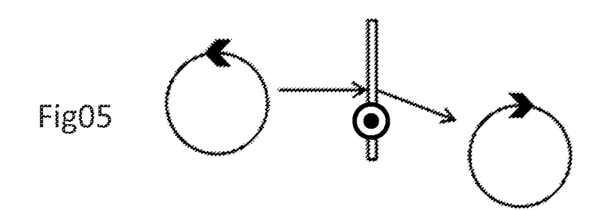
FIG. 5 is a third diagram showing a basic property of an OC-type polarizing diffraction grating.
Figures 06, 07:
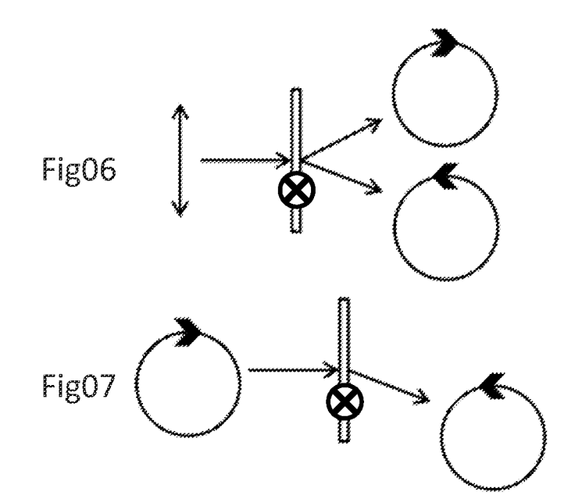
FIG. 6 is a fourth diagram showing a basic property of an OC-type polarizing diffraction grating.
FIG. 7 is a fifth diagram showing a basic property of an OC-type polarizing diffraction grating.
Figure 08:
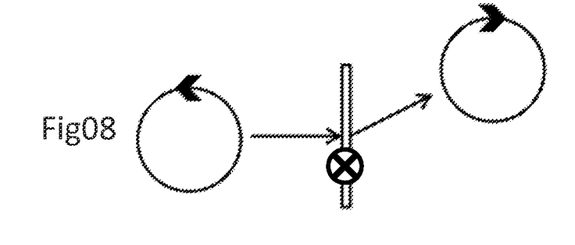
FIG. 8 is a sixth diagram showing a basic property of an OC-type polarizing diffraction grating.

The OC-type polarizing diffraction gratings 31, 32, 34, and 35 have basic properties as shown in FIGS. 3 to 8. In FIGS. 3 to 8, the axis of each polarization convertible diffraction device extends in the direction perpendicular to the plane including the incident and diffracted light. In the figures, a circle enclosing a dot ("•") and a circle enclosing a cross ("x") indicate one and the other parts, respectively, of the axis of a polarization convertible diffraction device divided at the just-mentioned plane. Those parts of the axis may be referred to also as the +90-degree axis and the −90-degree axis respectively. Specifically, the OC-type polarizing diffraction gratings 31, 32, 34, and 35 have the following properties: first, as shown in FIG. 3, they have the property of diffractively splitting linearly polarized light into left-handed circularly polarized light and right-handed circularly polarized light; second, as shown in FIG. 4, they have the property of converting right-handed circularly polarized light into left-handed circularly polarized light and simultaneously diffracting it at a predetermined angle; third, as shown in FIG. 5, they have the property of converting left-handed circularly polarized light into right-handed circularly polarized light and simultaneously diffracting it at a predetermined angle; and moreover, by arranging the OC-type polarizing diffraction gratings with their axes reversed as shown in FIGS. 6 to 8, it is possible to reverse the polarization state of the incident light and the diffraction direction and polarization state of the emergent light. Incidentally, also when the travel direction of the rays shown in FIGS. 3 to 8 is reversed, diffraction and polarization state conversion take place in similar manners. Suitable as the reflective member 33 is a prism that totally reflects rays incident on it at angles larger than the critical angle.

In this embodiment, the optical path length adjuster 30 is arranged between the collimator lens 22R and the RGB combiner prism 23 (see FIG. 1) to reduce speckles ascribable to the light emitted from the LD 21R in particular, out of the LDs 21R, 21G, and 21B. It is also possible to reduce speckles ascribable to an LD of another color by arranging an optical path length adjuster 30 between the collimator lens of that color and the RGB combiner prism 23.

Referring to FIG. 2, the incident light L1 that has passed through the collimator lens 22R (which is the laser light from the LD 21R, and is linearly polarized light) is incident on the first OC-type polarizing diffraction grating 31, and is split into left-handed circularly polarized light L2 and right-handed circularly polarized light L3, which are then each incident on the second OC-type polarizing diffraction grating 32. The laser light L2 and L3 incident on the second OC-type polarizing diffraction grating 32 are each converted to have the opposite polarization direction and diffracted to emerge at a predetermined angle of emergence. The diffracted laser light L2 (i.e., laser light L4) is reflected on reflective surfaces 33a and 33b of the reflective member 33 arranged at a stage succeeding the second OC-type polarizing diffraction grating 32, so as to be incident on the third OC-type polarizing diffraction grating 34. On the other hand, the diffracted laser light L3 (i.e., laser light L5) is incident on the third OC-type polarizing diffraction grating 34 without being reflected by the reflective member 33. Here, it is configured such that the axis direction of the first and second OC-type polarizing diffraction gratings 31 and 32 is opposite to the axis direction of the third and fourth OC-type polarizing diffraction gratings 34 and 35, of which the latter will be mentioned below.

The laser light L4 and L5 incident on the third OC-type polarizing diffraction grating 34 are each diffracted and thereby so converted as to have the opposite polarization direction. The diffracted laser light L4 and L5 (i.e., laser light L6 and L7) approach each other as they travel on, and are incident on the fourth OC-type polarizing diffraction grating 35, which is arranged at the position at which they converge on one point. The laser light L6 and L7 incident on the fourth OC-type polarizing diffraction grating 35 are each converted to have the opposite polarization direction and are diffracted to emerge in the same direction; the laser light L6 and L7 are thus combined together to become laser light L8.

With this configuration, one (laser light L2) of the components of the light split by the first OC-type polarizing diffraction grating 31 is reflected by the reflective member 33, with the result that the optical path length from the first OC-type polarizing diffraction grating 31 to the fourth OC-type polarizing diffraction grating 35 is larger than that of the other (laser light L3) of the split components of the light. Moreover, the difference between the two optical path lengths is set to be equal to or larger than the coherent length of the incident light L1. Accordingly, the laser light L8 is laser light that has an optical path length difference equal to or larger than the coherent length of the incident light L1 and that has two circularly polarized light having mutually perpendicular polarization directions overlaid together. In this way, speckles ascribable to the light emitted from the LD 21R are reduced.

With this configuration, laser light of a particular color is split by an OC-type polarizing diffraction grating; the split components of the light are made to travel such that an optical path length difference equal to or larger than the coherent length is produced, and are then combined together with high accuracy. In this way, it is possible to reduce speckles ascribable to light of a particular color.

In this embodiment, an optical path length difference is produced by reflecting one split component of light on the reflective member 33 and keeping the other split component from being reflected on the reflective member 33. It is also possible to produce an optical path length difference by reflecting both splits component on the reflective member 33. For example, an optical path length difference can be produced by designing an optical path such that the two split components of light are reflected different numbers of times on the reflective member 33.

Second Embodiment

In the first embodiment, to reduce speckles ascribable to laser light of a particular color, the optical path length adjuster 30 is arranged between the collimator lens into which the light from the LD of the particular color is incident and the RGB combiner prism 23. Instead, a plurality of optical path length adjusters 30 may be arranged each between a collimator lens and the RGB combiner prism 23. However, arranging an optical path length adjuster 30 between each of the collimator lenses 22R, 22G, and 22B and the RGB combiner prism 23 requires a total of three optical path length adjusters 30, leading to an increased cost. To avoid that, in this embodiment, to reduce speckles ascribable to laser light of all colors, an optical path length adjuster 30 is arranged at a stage succeeding the RGB combiner prism 23.

There is no particular limitation on the position at which to arrange the optical path length adjuster 30 so long as it is at a stage succeeding the RGB combiner prism 23 but preceding the horizontal scanning mirror 26. This embodiment deals with an example where the optical path length adjuster 30 is arranged between the deflecting mirror 25 and the horizontal scanning mirror 26. In this embodiment, the LDs 21R, 21G, and 21B serve as a light source that feeds the optical path length adjuster 30 with laser light.

Figure 09:
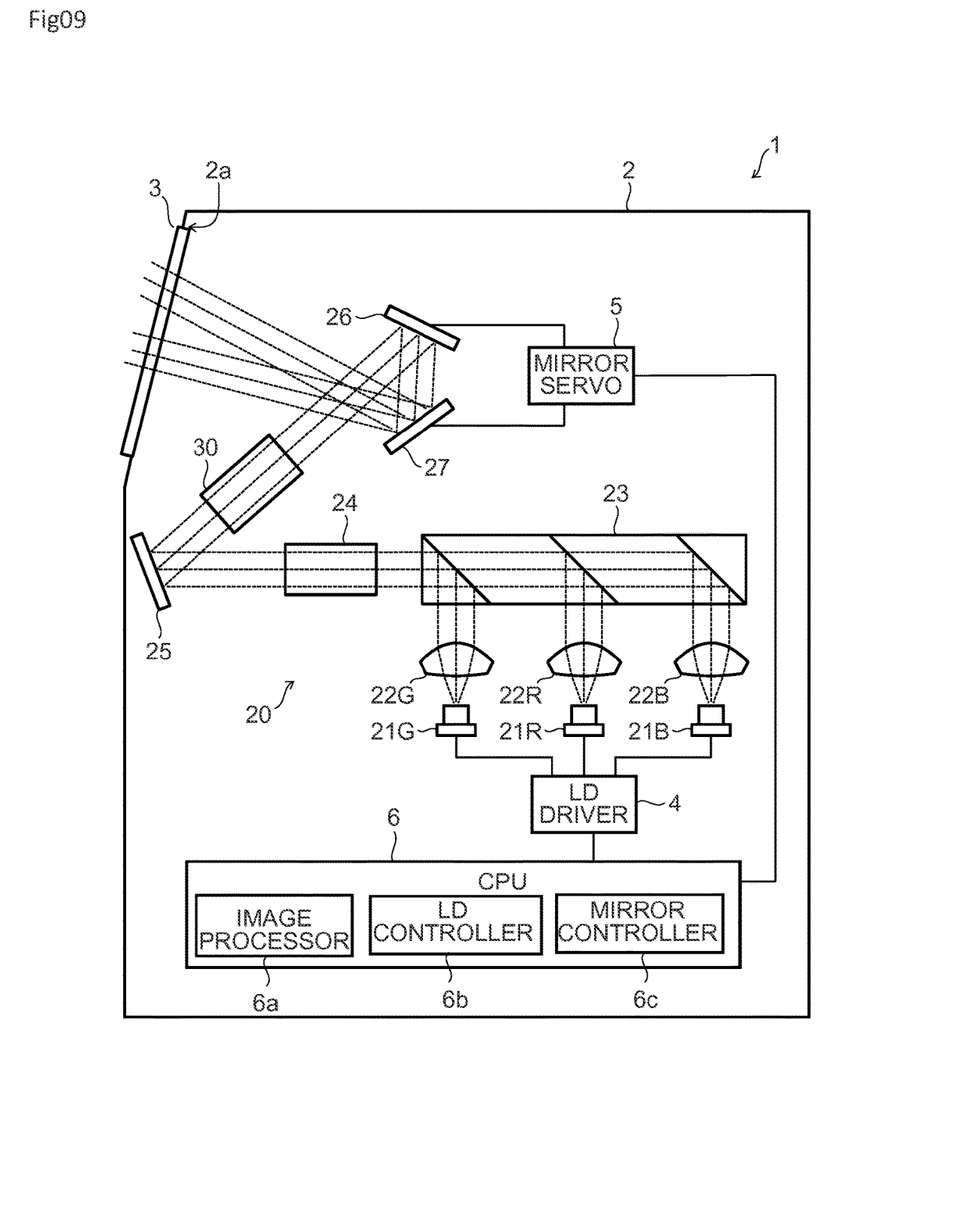
FIG. 9 is an outline configuration diagram of a laser scanning projector according to a second embodiment of the present invention.

FIG. 9 is an outline configuration diagram of a laser scanning projector according to a second embodiment of the present invention. How the laser light reflected from the deflecting mirror 25 is handled after being incident on the first OC-type polarizing diffraction grating 31 until being combined together by the fourth OC-type polarizing diffraction grating 35 is the same as in the first embodiment.

With this embodiment, it is possible, with no increase in cost, to split laser light having RGB laser light combined together by use of OC-type polarizing diffraction gratings, then make the split components of the light travel such that an optical path length difference equal to or larger than the coherent length is produced, and then combine them together with high accuracy. It is thus possible to reduce speckles ascribable to laser light of all colors.

Third Embodiment

Figure 10:
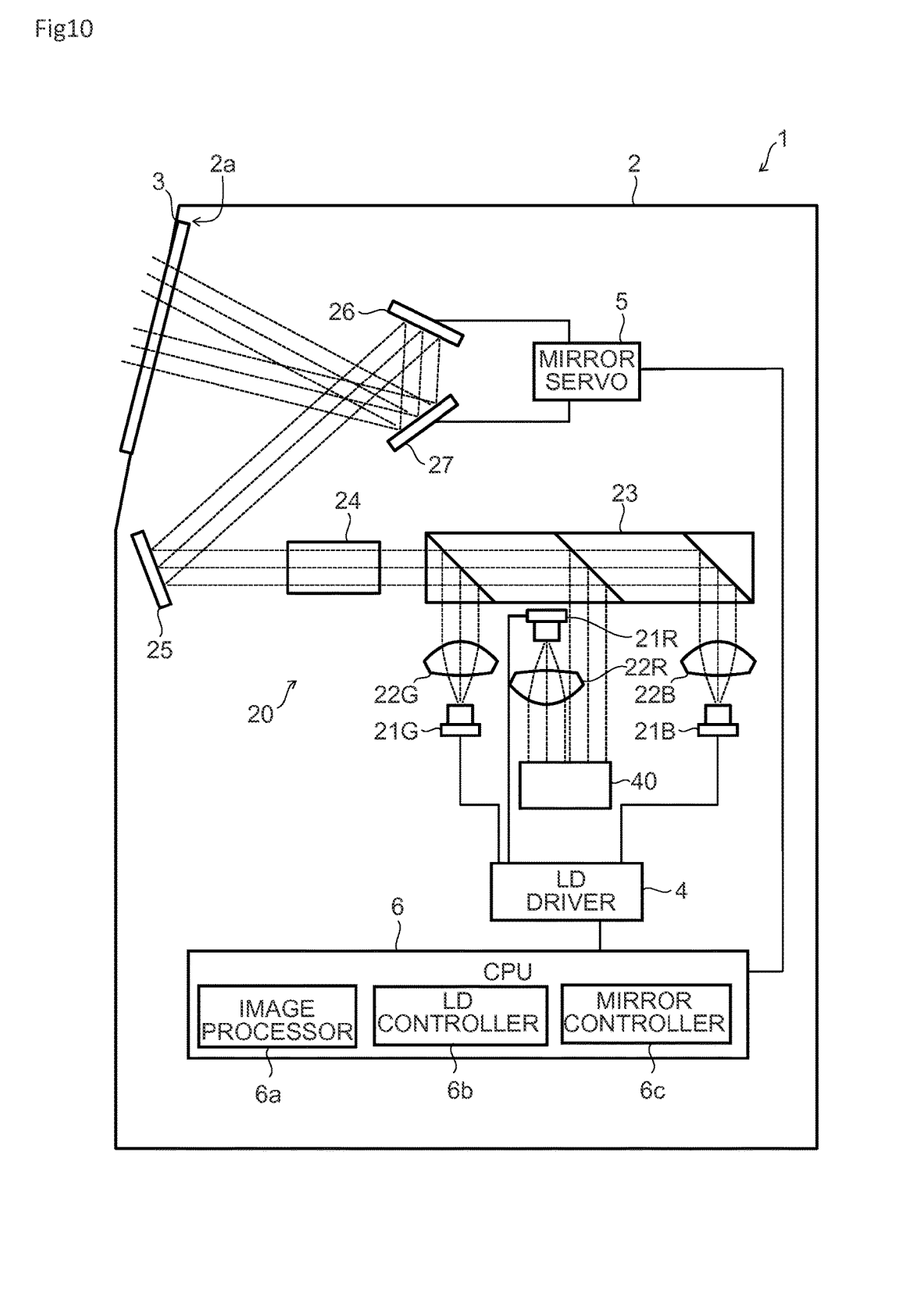
FIG. 10 is an outline configuration diagram of an optical path length adjuster provided in a laser scanning projector according to a third embodiment of the present invention.

In the first and second embodiments, the direction in which laser light is incident into the optical path length adjuster 30 is the same as the direction in which the laser light emerges out of the optical path length adjuster 30. This, however, is not meant to be any limitation; those directions may be opposite to each other. FIG. 10 is an outline configuration diagram of an optical path length adjuster provided in a laser scanning projector according to a third embodiment of the present invention.

This and the first embodiments are similar in that an optical path length adjuster 40 is arranged between the collimator lens 22R and the RGB combiner prism 23, but differ in that, in this embodiment, the direction in which the LD 21R emits laser light is opposite to the direction in which the LDs 21G and 21B emit laser light.

Figure 11:
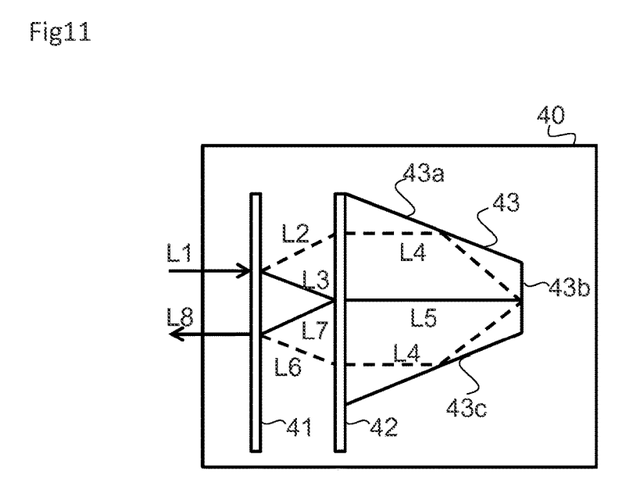
FIG. 11 is an outline configuration diagram of an optical path length adjuster provided in a laser scanning projector according to the third embodiment.

Referring to FIG. 11, the optical path length adjuster 40 includes, in the direction along the travel direction of the incident light L1, a first OC-type polarizing diffraction grating 41 and a second OC-type polarizing diffraction grating 42. The first and second OC-type polarizing diffraction gratings 42 and 43 are arranged at a predetermined interval from each other. Moreover, at a stage succeeding the second OC-type polarizing diffraction grating 42, a reflective member 43 is arranged.

The following description of the embodiment assumes that the optical path length adjuster 40 is configured to include a first and a second OC-type polarizing diffraction grating 41 and 42 and a reflective member 43, but the optical path length adjuster 40 may instead be configured to include part of those components. For example, the optical path length adjuster 40 may include a second OC-type polarizing diffraction grating 42 and a reflective member 43, but not a first OC-type polarizing diffraction grating 41. The optical path length adjuster 40 serves not only to produce an optical path length difference between the split components of the light but also to make them incident into the first OC-type polarizing diffraction grating 41 at a predetermined angle. Thus, the optical path length adjuster 40 may be considered to be so configured as to include an incident angle adjuster that adjusts the angle of incidence of the split components of the light with respect to the first OC-type polarizing diffraction grating 41. Alternatively, the optical path length adjuster 40 and the incident angle adjuster may be considered to be equivalent to each other. In this embodiment, the reflective member 43 can be said to be configured to be used chiefly to adjust the optical path length difference, and the second OC-type polarizing diffraction grating 42 can be said to be configured to be used chiefly to adjust the angle of incidence of the split components of the light with respect to the first OC-type polarizing diffraction grating 41.

The incident light L1 that has passed through the collimator lens 22R (which is the light from the LD 21R, and is linearly polarized light) is incident on the first OC-type polarizing diffraction grating 41, and is split into left-handed circularly polarized light L2 and right-handed circularly polarized light L3, which are then each incident on the second OC-type polarizing diffraction grating 42. The laser light L2 and L3 incident on the second OC-type polarizing diffraction grating 42 are each diffracted at a predetermined angle, and have their respective polarization directions reversed. The diffracted laser light L2 (i.e., laser light L4) is reflected sequentially on reflective surfaces 43a, 43b, and 43c of the reflective member 43 arranged at a stage succeeding the second OC-type polarizing diffraction grating 42 to have its travel direction turned by 180 degrees; the light is thus then incident on the second OC-type polarizing diffraction grating 42 at its rear surface (the surface opposite from the one at which the laser light L2 is incident). On the other hand, the diffracted laser light L3 (i.e., laser light L5) is reflected on the reflective surface 43b of the reflective member 43 to have its travel direction turned by 180 degrees; the light is thus then incident on the second OC-type polarizing diffraction grating 42 at its rear surface (the surface opposite from the one on which the laser light L3 is incident).

The laser light L4 and L5 incident on the second OC-type polarizing diffraction grating 42 are now incident on it as circularly polarized light traveling in the direction opposite from that in which they are incident at the front surface, and are thus diffracted at the angles opposite to those at which the light incident at the front surface are diffracted. The diffracted laser light L4 and L5 (i.e., laser light L6 and L7) approach each other as they travel on, and are incident on the first OC-type polarizing diffraction grating 41 at its rear surface (the surface opposite from the one at which the laser light L1 is incident). The laser light L6 and L7 incident on the first OC-type polarizing diffraction grating 41 are each diffracted in the direction opposite from that in which the light incident at the front surface is diffracted, and are combined (overlaid) together to become laser light L8.

With this configuration, of the components of the light split by the first OC-type polarizing diffraction grating 31, one (the laser light L2) is reflected on the reflective member 33 three times, while the other (the laser light L3) is reflected only once on the reflective member 33. Thus, a difference in the number of times of reflection makes the optical path length of the former larger than the optical path length of the latter. Moreover, the difference between the optical path lengths of the two split components of light is set to be equal to or larger than the coherent length of the incident light L1. This allows the laser light L8 to be free from interference between overlaid rays and to have rays having mutually perpendicular polarization directions to be overlaid together, resulting in reduced speckles ascribable to the light emitted from the LD 21R.

This embodiment brings the same effect as the first embodiment. In addition, by making light incident on the same OC-type polarizing diffraction grating a plurality of times (in this embodiment, twice, specifically, once at the front surface and once at the rear surface), it is possible to reduce the number of OC-type polarizing diffraction gratings required, leading to reduced size and cost of the optical path length adjuster.

This embodiment may be applied to the second embodiment.

Fourth Embodiment

Figure 12:
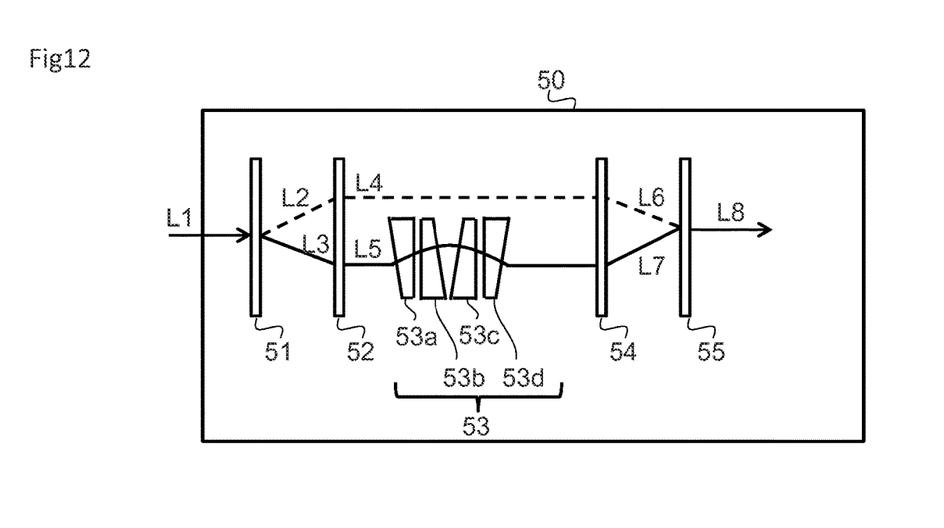
FIG. 12 is an outline configuration diagram of an optical path length adjuster provided in a laser scanning projector according to a fourth embodiment of the present invention.

In the first and second embodiments described above, to produce an optical path length difference between split components of light, a reflective member is arranged at a stage succeeding an OC-type polarizing diffraction grating for splitting laser light, and the split components of the light are reflected on the reflective member different numbers of times. It is, however, also possible to produce an optical path length difference without arranging a reflective member. FIG. 12 is an outline configuration diagram of an optical path length adjuster provided in a laser scanning projector according to a fourth embodiment of the present invention, and this optical path length adjuster may be used in place of the optical path length adjuster 30 provided in the laser scanning projectors according to the first and second embodiments.

Referring to FIG. 12, the optical path length adjuster 50 includes, in the order along the travel direction of the incident light L1, a first OC-type polarizing diffraction grating 51, a second OC-type polarizing diffraction grating 52, a third OC-type polarizing diffraction grating 54, and a fourth OC-type polarizing diffraction grating 55. These OC-type polarizing diffraction gratings are arranged at predetermined intervals from each other. Moreover, a refractive member 53 is arranged between the second and third OC-type polarizing diffraction gratings 52 and 54, on the optical path of one (laser light L5) of split components of light.

The refractive member 53 is composed of four prisms 53a to 53d all having the same structure. These prisms each have a surface perpendicular to the optical axis of the incident light and a surface inclined by a predetermined angle relative to the surface perpendicular to the optical axis, and are arranged one next to the other along the optical axis direction.

The following description of the embodiment assumes that the optical path length adjuster 50 is configured to include a first to a fourth OC-type polarizing diffraction grating 51, 52, 54, and 55 and a refractive member 53, but the optical path length adjuster 50 may instead be configured to include part of those components. For example, the optical path length adjuster 50 may include a second and a third OC-type polarizing diffraction grating 52 and 54 and a refractive member 53, but not a first and a fourth OC-type polarizing diffraction grating 51 and 55. The optical path length adjuster 50 serves not only to produce an optical path length difference between the split components of the light but also to make them incident into the fourth OC-type polarizing diffraction grating 55 at a predetermined angle. Thus, the optical path length adjuster 50 may be considered to be so configured as to include an incident angle adjuster that adjusts the angle of incidence of the split components of the light with respect to the fourth OC-type polarizing diffraction grating 55. Alternatively, the optical path length adjuster 50 and the incident angle adjuster may be considered to be equivalent to each other. In this embodiment, the refractive member 53 can be said to be configured to be used chiefly to adjust the optical path length difference, and the third OC-type polarizing diffraction grating 54 can be said to be configured to be used chiefly to adjust the angle of incidence of the split components of the light with respect to the fourth OC-type polarizing diffraction grating 55.

The incident light L1 is incident on the first OC-type polarizing diffraction grating 51, and is split into left-handed circularly polarized light L2 and right-handed circularly polarized light L3, which are then each incident on the second OC-type polarizing diffraction grating 52. The laser light L2 and L3 incident on the second OC-type polarizing diffraction grating 52 are each diffracted at a predetermine dangle, and have their respective polarization directions reversed. The diffracted laser light L2 (i.e., laser light L4) is incident on the third OC-type polarizing diffraction grating 54. On the other hand, the diffracted laser light L3 (i.e., laser light 15) is incident on the refractive member 53. Here, it is configured such that the axis direction of the first and second OC-type polarizing diffraction gratings 51 and 52 is opposite to the axis direction of the third and fourth OC-type polarizing diffraction gratings 54 and 55, of which the latter will be mentioned below.

The laser light L5, as it passes through the prisms 53a and 53b, has its optical path bent from the original optical axis as shown in FIG. 12; but then the light L5 has its original optical path recovered by the prisms 53c and 53d. Thus, the light that passes through the refractive member 53 (the laser light L5) is incident on the third OC-type polarizing diffraction grating 54 with no deviation from the optical axis. In addition, the optical path length of the light that passes through the refractive member 53 (the laser light L5) (i.e., the optical path length of the light after emerging from the second OC-type polarizing diffraction grating 52 until being incident on the third OC-type polarizing diffraction grating 54) is larger than the optical path length of the light that does not pass through the refractive member 53 (the laser light L4) (i.e., the optical path length of the light after emerging from the second OC-type polarizing diffraction grating 52 until being incident on the third OC-type polarizing diffraction grating 54).

The laser light L4 and L5 incident on the third OC-type polarizing diffraction grating 54 are diffracted and thereby have their respective polarization directions reversed. The diffracted laser light L4 and L5 (i.e., laser light L6 and L7) approach each other as they travel on, and are incident on the fourth OC-type polarizing diffraction grating 55 arranged at the position at which they converge on one point. The laser light L6 and L7 incident on the fourth OC-type polarizing diffraction grating 55 are so converted as to have their respective polarization directions reversed, and are simultaneously so diffracted as to emerge in the same direction to become laser light L8.

With this configuration, one (L3) of the components of the light split by the first OC-type polarizing diffraction grating 51 is refracted as it passes through the refractive member 53 to have a larger optical path length; thus the optical path length of this component of the light from the first OC-type polarizing diffraction grating 51 to the fourth OC-type polarizing diffraction grating 55 is larger than that of the other component (L2) of the light. Moreover, the optical path length difference between the two components of the light is set to be equal to or larger than the coherent length of the incident light L1. Thus, the laser light L8 is light that has an optical path length difference equal to or larger than the coherent length and that has mutually perpendicularly circularly polarized light overlaid together. In this way, speckles attributable to the light emitted from the LD 21R are reduced.

This embodiment brings the same effect as the first embodiment. In addition, it is possible, without using a reflective member, to adjust the optical path length difference between split components of light.

Studies on Different Embodiments of the Invention

Different embodiments of the invention will be studied below.

According to one aspect of the present invention, an electronic appliance W1 includes: a first polarization convertible diffraction device which splits laser light emitted from a light source into a plurality of components of the laser light; a second polarization convertible diffraction device which combines together the plurality of components of the laser light into combined laser light; an optical path length adjuster which adjusts the optical path length difference between the plurality of components of the laser light along the path between the first and second polarization convertible diffraction devices; and an angle-of-incidence adjuster which adjusts, to predetermined angles, the angles of incidence at which the plurality of components of the laser light are respectively incident on the second polarization convertible diffraction device.

In the electronic appliance W1 configured as described above, it is preferable that the optical path length adjuster include a prism.

In the electronic appliance W1 configured as described above, it is preferable that the angle-of-incidence adjuster include a third polarization convertible diffraction device.

In the electronic appliance W1 configured as described above, it is preferable that the prism comprise a reflective member arranged between the first and second polarization convertible diffraction devices, and that the reflective member reflect at least one of the plurality of components of the laser light.

In the electronic appliance W1 configured as described above, it is preferable that the plurality of components of the laser light be reflected different numbers of times respectively on the reflective member.

In the electronic appliance W1 configured as described above, it is preferable that the prism comprise a plurality of refractive members.

In the electronic appliance W1 configured as described above, it is preferable that the plurality of refractive members be arranged between the first and second polarization convertible diffraction devices, in the optical path of, out of the plurality of components of the laser light, a first component of the laser light but not in the optical path of, out of the plurality of components of the laser light, a second component of the laser light.

In the electronic appliance W1 configured as described above, it is preferable that the plurality of refractive members all have an identical structure.

In the electronic appliance W1 configured as described above, it is preferable that the first and second polarization convertible diffraction devices be arranged at a predetermined distance away from each other.

In the electronic appliance W1 configured as described above, it is preferable that the optical path length adjuster serve also as the angle-of-incidence adjuster.

In the electronic appliance W1 configured as described above, it is preferable that the light in which a plurality of mutually different polarization states are combined together as an incoherent combination.

In the electronic appliance W1 configured as described above, it is preferable that the direction in which the laser light emitted from the light source is incident on the first polarization convertible diffraction device is substantially identical with the direction in which the combined laser light emerges from the second polarization convertible diffraction device as a result of the plurality of components of the laser light being combined together.

In the electronic appliance W1 configured as described above, it is preferable that there by further provided a plurality of light emitting devices which emit light of mutually different colors respectively, and that the light source comprise at least one of the plurality of light emitting devices.

In the electronic appliance W1 configured as described above, it is preferable that the optical path length difference be equal to or larger than the coherent length of the laser light emitted from the light source.

In the electronic appliance W1 configured as described above, it is preferable that the direction in which the laser light emitted from the light source is incident on the first polarization convertible diffraction device is substantially identical with the direction in which the combined laser light emerges from the second polarization convertible diffraction device as a result of the plurality of components of the laser light being combined together.

In the electronic appliance W1 configured as described above, the first polarization convertible diffraction device is implemented by, for example, the first OC-type polarizing diffraction grating (31, 51) in the projector 1; the second polarization convertible diffraction device is implemented by, for example, the fourth OC-type polarizing diffraction grating (35, 55) in the projector 1. The optical path length adjuster includes a prism, and this prism is implemented by, for example, the reflective member 33 or the refractive member 53 in the projector 1. The angle-of-incidence adjuster includes a third polarization convertible diffraction device, and this third polarization convertible diffraction device is implemented by, for example, the third OC-type polarizing diffraction grating (34, 54) in the projector 1.

Referring to FIG. 2, the reflective member 33 is a member that is arranged between the first and fourth OC-type polarizing diffraction gratings 31 and 35 and that reflects one (laser light L4) of a plurality of components of laser light (laser light L4 and L5). In a modified example, the reflective member 33 may instead be a reflective member that reflects two or more of the plurality of components of laser light, in which case different components of laser light can be reflected different numbers of times on the reflective member.

Referring to FIG. 12, the refractive member 53 is composed of a plurality of refractive members 53a to 53d. These refractive members are arranged between the first and fourth OC-type polarizing diffraction gratings 31 and 35, in the optical path of a first component (laser light L5) out of the plurality of components of laser light (laser light L4 and L5) but not in the optical path of a second component (laser light L4) out of the plurality of components of laser light (laser light L4 and L5). The plurality of refractive members 53a to 53d can all have an identical structure.

Referring to FIGS. 2 and 12, the first and fourth OC-type polarizing diffraction gratings 31 and 35 are arranged at a predetermined distance away from each other. The prism (the reflective member 33 or the refractive member 53) serves not only to adjust the optical path length difference, but also to adjust the angles of incidence of the different components of laser light with respect to the fourth OC-type polarizing diffraction grating 35. Thus, the prism can be said to serve both as an optical path length adjuster and as an angle-of-incidence adjuster. The laser light resulting from the combining by the fourth OC-type polarizing diffraction grating 35 is non-linearly polarized light (the light in which a plurality of mutually different polarization states are combined together as an incoherent combination). The direction in which the laser light L1 is incident on the first OC-type polarizing diffraction grating 31 is substantially identical with the direction in which the laser light L8 emerges from the fourth OC-type polarizing diffraction grating 35. The optical path length difference adjusted by the prism is equal to or larger than the coherent length of the incident light L1.

Referring to FIGS. 1 and 9, the laser light incident on the first OC-type polarizing diffraction grating 31, i.e., the laser light L1, may only contain the laser light emitted from a particular one of a plurality of light emitting devices that emit light of mutually different colors, or may contain the laser light emitted from all of those light emitting devices. That is, the light source can include at least one of a plurality of light emitting devices.

According to another aspect of the present invention, an electronic appliance W2 includes: a first polarization convertible diffraction device which splits laser light emitted from a light source into a plurality of components of the laser light and which combines together the plurality of components of the laser light into combined laser light; an optical path length adjuster which adjusts the optical path length difference between the plurality of components of the laser light along the path from splitting to combining by the first polarization convertible diffraction device; and an angle-of-incidence adjuster which adjusts, to predetermined angles, the angles of incidence at which the plurality of components of the laser light are respectively incident on the first polarization convertible diffraction device.

In the electronic appliance W2 configured as described above, it is preferable that the optical path length adjuster include a prism.

In the electronic appliance W2 configured as described above, it is preferable that the angle-of-incidence adjuster include a second polarization convertible diffraction device.

In the electronic appliance W2 configured as described above, it is preferable that the laser light emitted from the light source pass through the first and second polarization convertible diffraction devices a plurality of times.

In the electronic appliance W2 configured as described above, it is preferable that the direction in which the laser light emitted from the light source is incident on the first polarization convertible diffraction device is substantially opposite to the direction in which the combined laser light emerges from the first polarization convertible diffraction device as a result of the plurality of components of the laser light being combined together.

In the electronic appliance W2 configured as described above, the first polarization convertible diffraction device is implemented by, for example, the first OC-type polarizing diffraction grating 41 in the projector 1. The optical path length adjuster includes a prism, and this prism is implemented by, for example, the reflective member 43 in the projector 1. The angle-of-incidence adjuster includes a second polarization convertible diffraction device, and this second polarization convertible diffraction device is implemented by, for example, the fourth OC-type polarizing diffraction grating 44 in the projector 1.

Referring to FIG. 11, the laser light L1 passes through the first and second OC-type polarizing diffraction gratings 41 and 42 a plurality of times while being split and reflected. The direction in which the laser light L1 is incident on the first OC-type polarizing diffraction grating 41 is substantially opposite to the direction in which the laser light L8 emerges from the first OC-type polarizing diffraction grating 41.

According to yet another aspect of the present invention, a method W3 for combining together laser light includes: splitting, by a first polarization convertible diffraction device, laser light emitted from a light source into a plurality of components of the laser light; combining together, by a second polarization convertible diffraction device, the plurality of components of the laser light; adjusting the optical path length difference between the plurality of components of the laser light along the path between the first and second polarization convertible diffraction devices; and adjusting, to predetermined angles, the angles of incidence at which the plurality of components of the laser light are respectively incident on the second polarization convertible diffraction device.

What is claimed is:

1. An electronic appliance comprising:
a first polarization convertible diffraction device which splits laser light emitted from a light source into a plurality of components of the laser light;
a second polarization convertible diffraction device which combines together the plurality of components of the laser light into combined laser light;
an optical path length adjuster which adjusts an optical path length difference between the plurality of components of the laser light along a path between the first and second polarization convertible diffraction devices; and
an angle-of-incidence adjuster which adjusts, to predetermined angles, angles of incidence at which the plurality of components of the laser light are respectively incident on the second polarization convertible diffraction device,
wherein
the optical path length adjuster includes a prism, and
the prism comprises a reflective member arranged between the first and second polarization convertible diffraction devices, the reflective member reflecting at least one of the plurality of components of the laser light.

2. The electronic appliance of claim 1, wherein the angle-of-incidence adjuster includes a third polarization convertible diffraction device.

3. The electronic appliance of claim 1, wherein the plurality of components of the laser light are reflected different numbers of times respectively on the reflective member.

4. The electronic appliance of claim 1, wherein the first and second polarization convertible diffraction devices are arranged at a predetermined distance away from each other.

5. The electronic appliance of claim 1, wherein the optical path length adjuster serves also as the angle-of-incidence adjuster.

6. The electronic appliance of claim 1, wherein the laser light in which a plurality of mutually different polarization states are combined together as an incoherent combination.

7. The electronic appliance of claim 1, wherein a direction in which the laser light emitted from the light source is incident on the first polarization convertible diffraction device is substantially identical with a direction in which the combined laser light emerges from the second polarization convertible diffraction device as a result of the plurality of components of the laser light being combined together.

8. The electronic appliance of claim 1, further comprising a plurality of light emitting devices which emit light of mutually different colors respectively, wherein
the light source comprises at least one of the plurality of light emitting devices.

9. The electronic appliance of claim 1, wherein the optical path length difference is equal to or larger than a coherent length of the laser light emitted from the light source.

10. An electronic appliance comprising:
a first polarization convertible diffraction device which splits laser light emitted from a light source into a plurality of components of the laser light;
a second polarization convertible diffraction device which combines together the plurality of components of the laser light into combined laser light;
an optical path length adjuster which adjusts an optical path length difference between the plurality of components of the laser light along a path between the first and second polarization convertible diffraction devices; and
an angle-of-incidence adjuster which adjusts, to predetermined angles, angles of incidence at which the plurality of components of the laser light are respectively incident on the second polarization convertible diffraction device,
wherein
the optical path length adjuster includes a prism,
the prism comprises a plurality of refractive members, and
the plurality of refractive members are arranged between the first and second polarization convertible diffraction devices, in an optical path of, out of the plurality of components of the laser light, a first component of the laser light but not in an optical path of, out of the plurality of components of the laser light, a second component of the laser light.

11. The electronic appliance of claim 10, wherein the plurality of refractive members all have an identical structure.

12. The electronic appliance of claim 10, wherein the first and second polarization convertible diffraction devices are arranged at a predetermined distance away from each other.

13. The electronic appliance of claim 10, wherein the optical path length adjuster serves also as the angle-of-incidence adjuster.

14. The electronic appliance of claim 10, wherein the laser light in which a plurality of mutually different polarization states are combined together as an incoherent combination.

15. The electronic appliance of claim 10, wherein a direction in which the laser light emitted from the light source is incident on the first polarization convertible diffraction device is substantially identical with a direction in which the combined laser light emerges from the second polarization convertible diffraction device as a result of the plurality of components of the laser light being combined together.

16. The electronic appliance of claim 10, further comprising a plurality of light emitting devices which emit light of mutually different colors respectively, wherein
the light source comprises at least one of the plurality of light emitting devices.

17. The electronic appliance of claim 10, wherein the optical path length difference is equal to or larger than a coherent length of the laser light emitted from the light source.

18. An electronic appliance comprising:
a first polarization convertible diffraction device which splits laser light emitted from a light source into a plurality of components of the laser light and which combines together the plurality of components of the laser light into combined laser light;
an optical path length adjuster which adjusts an optical path length difference between the plurality of components of the laser light along a path from splitting to combining by the first polarization convertible diffraction device; and an angle-of-incidence adjuster which adjusts, to predetermined angles, angles of incidence at which the plurality of components of the laser light are respectively incident on the first polarization convertible diffraction device, wherein the angle-of-incidence adjuster includes a second polarization convertible diffraction device, and the laser light emitted from the light source passes through the first and second polarization convertible diffraction devices a plurality of times.

19. The electronic appliance of claim 18, wherein the optical path length adjuster includes a prism.

20. The electronic appliance of claim 18, wherein a direction in which the laser light emitted from the light source is incident on the first polarization convertible diffraction device is substantially opposite to a direction in which the combined laser light emerges from the first polarization convertible diffraction device as a result of the plurality of components of the laser light being combined together.

* * * * *